Patented June 2, 1953 2,640,767

UNITED STATES PATENT OFFICE 2,640,767

ETCHING

John A. Easley and Harry E. Swayze, Midland, Mich., assignors to The Dow Chemical Company, Midland, Mich., a corporation of Delaware No Drawing. Application February 12, 1951, Serial No. 210,618

5 Claims. (Cl. 41—42)

The invention relates to a method of etching metal. It more particularly concerns an improved method of producing a relief in the surface of an object of a metal easily soluble in acid, as in making a printing plate by etching with an acid solution.

In the conventional method of making a metal printing surface, as in making a photoengraving of an acid-soluble metal such as magnesium and its alloys, a light sensitive coating or "enamel" is applied to the metal surface which is usually flat or cylindrical. The coated surface is exposed to light through a negative having an image therein so as to produce a corresponding image in the coating. The exposed coated surface is "developed" forming an acid resistant coating in the form of the image produced by the exposure. The acid resistant coating, which is referred to as a resist, is usually further hardened as by a hardening treatment which increases its resistance to the etching acid. The surface of the metal bearing the so-prepared resist is then subjected to etching by an acid.

The etching is usually carried out with nitric acid suitably diluted with water, the acid solution being usually splashed or otherwise impinged against the object. The acid solution attacks the bare portions of the metal, that is, the portions of the object denuded of the light sensitive material in the developing operation. The rest of the metal surface is protected by the resist from direct attack by the acid which does not penetrate the resist. As the etching proceeds, metal from the bare portions of the object dissolves away leaving the image in vertical relief. As soon as a moderate depth of etch is made in this way attack by the acid in a lateral direction on the metal supporting the acid-resisting image becomes noticeable and the resist may be undercut slightly around its edges. Before a significant amount of the metal forming the relief is dissolved away by lateral attack, the etching solution is rinsed off, the rinsed object is dried, and the dried object is then treated to protect the metal relief from lateral attack by the acid when the object is subjected to further etching. One method of providing this protection is to powder the object in each of four directions, i. e. N. S. E. and W. with an acid-resisting powdered material called "etching powder" so as to coat with the powder all sides of the portions of the metal in relief. After each powdering, the powder is "burned in," that is, the powdered etched object is heated to fuse and fix the acid-resisting material in place as an acid resisting coating. The object thus protected by powdering or otherwise is then given a second etch. This etch increases the depth of the prior etch without attack on the metal already in relief, the sides of which are protected from the acid.

The second etch, like the first, is stopped before a significant amount of attack is produced on the sides of the relief below the protected portion, and, as before, the etched object is again rinsed, dried, and given a protective treatment as by powdering so as to form an acid-resisting coating on all sides of the newly formed portion of the relief. The object is then ready for a third etch which is carried out in a manner similar to the preceding etches. The object is thus alternately subjected to etching, protecting of the relief, and etching so as to accentuate the relief while restraining attack by the acid on the image-supporting metal in relief, until a sufficient depth of etch is produced in the surface of the object not coated with resist to meet printing requirements. The number of etches made by the acid or "bites," as these etches are called in the trade, is usually three, four or five depending upon the character of the image and the depth of etch required. The foregoing steps are well known in the art and are practiced in various ways best adapted to the work in hand.

Although the acid etches away the metal rapidly, the time taken for the entire operation of completing the preparation of the relief or printing surface for example, when several bites are to be made, is inordinately large. This is due mainly to the numerous time-consuming steps of rinsing, drying, and protecting the relief which are required between each bite of the etcher to prevent undercutting the image while obtaining a sufficient depth of etch for the purpose in hand and are more time-consuming than the etching operation itself It is the principal object of the invention to provide a method of preparation of a metal relief by etching with acid, as in the preparation of a metal printing surface, which may be carried out with dispatch. Another object of the invention is to reduce or prevent the attack of the acid on the metal in relief under an acid resist and thereby reduce or eliminate the need for interposing one or more protective treatments, e. g. powdering and burning in, to save the relief from lateral attack as it forms during etching. Other objects and advantages will become apparent during the description of the invention.

The invention is predicated upon the discovery that by including in the acid etching bath, and impinging the bath composition against the object to be etched, certain agents which produce a removable acid resistant film that exerts a controlling effect on the dissolving action of the acid, the dissolving action of the acid normal to the surface of the work is not adversely affected while the dissolving action laterally, that is, in a direction which tends to dissolve away metal in relief and undercut the resist, is substantially reduced. As a result, there is obtained a deeper etch without significant loss in area of surface in relief and one or more, if not all, protective treatments, applied after the relief forms to prevent etching of the relief, may be eliminated. The elimination of one or more, if not all, the protective treatments, results in faster production of a finished etched object and substantial savings in both labor and materials.

In connection with evaluating the effects of the agents added to the acid etching bath according to the invention for controlling the etching action of the acid, the term "etch factor" is used. This term is defined as the ratio of the depth of the etch adjacent to a line of resist to one-half the loss in width of metal at the top of the surface of the relief beneath the line of resist. The etch factor affords a measure of the amount of attack by the acid laterally (i. e. parallel to the surface bearing the relief). The etch factor varies to some extent with the area of the bare metal exposed to the etcher as well as the depth of etch. For purpose of making comparative tests, these variations may be ignored if the bare metal surface adjacent to the resist is at least 0.02 inch wide and the etch is carried to a depth of at least 0.005 inch in each test.

In tests of nitric acid solutions consisting of from 1 to 50 per cent of $HNO_3$ in water by weight, the etch factors observed range from about 1.5 to about 7 using a magnesium-base alloy plate having a nominal composition of 3 per cent aluminum, 1 per cent zinc, 0.2 per cent manganese, the balance being magnesium and impinging the acid solution against the plate, as by means of an air stream or splashing, until etched to a depth of about 0.010 inch.

By the present invention, the etch factor of the nitric acid etching bath is substantially increased, thereby making it possible to reduce, as already mentioned, the overall time required to produce the desired depth of relief in the metal surface.

In carrying out the invention, nitric acid diluted with water to a suitable concentration is used. It is generally not desirable to greatly dilute the acid as this reduces its rate of action on the metal. On the other hand, if insufficient dilution is employed, the action of the acid may be too severe and the resist may be injured, as when the concentration exceeds about 50 per cent of $HNO_3$ by weight. Concentrations in the range of 3 to 20 per cent $HNO_3$ are generally most useful. A preferred range of concentration is 5 to 10 per cent, while a concentration of 7 per cent of $HNO_3$ by weight is generally satisfactory.

In accordance with the invention, there is added to the suitably diluted (with water) nitric acid solution a petroleum sulfonate, e. g. petroleum sulfonic acids having from 18 to 30 carbon atoms, and salts of these acids often referred to as naphthenic soaps, or mahogany soaps. The preferred sulfonates have 24 to 26 carbon atoms. The composition of the sodium salts may be expressed by the emperical formula $C_xH_ySO_3Na$, in which $x$ is an integer from 18 to 30 and $y=(2x-10)$. These materials are commerically available usually as mineral oil solutions in which the dissolved petroleum sulfonate comprises about 45 to 65 per cent of the mixture by weight, and the balance is substantially all mineral oil. There is used also in the bath a quantity of a petroleum oil fraction boiling in the range of 90° to 390° C. in addition to the mineral oil usually present with the petroleum sulfonate so that the total amount of mineral oil or petroleum fraction in the bath is at least 1.3 times the weight the petroleum sulfonate but not more than 0.15 of the weight of the nitric acid solution. Examples of such petroleum fractions are gasoline, benzine, kerosene, coal oil, and lubricating oils. These liquids are mixtures of various hydrocarbons, mostly saturated, of the paraffin series having from 6 to 18 carbon atoms. The amount of petroleum sulfonate and petroleum oil fraction to use depends in part upon the concentration of the $HNO_3$ in the nitric acid solution and in part upon the tendency for these additives to reduce the rate of etching of the nitric acid. If these additives are used in too small an amount, the etch factor is not increased. On the other hand, too large an amount of either the petroleum sulfonate or the petroleum oil fraction interferes with the etching action of the acid. The amounts used fall within these extremes and may be ascertained by trial. In general, the petroleum sulfonate may be used in an amount ranging in general from about 0.01 to 0.2 and preferably from 0.03 to 0.09 of the weight of the $HNO_3$ in the nitric acid solution.

The following examples are illustrative of the invention:

*Example 1*

A plate formed of a magnesium-base alloy having a nominal composition of 3 per cent of aluminum, 1 per cent of zinc, 0.2 per cent of manganese, the balance being magnesium is coated with a conventional light sensitive enamel and exposed through a photographic negative having a series of parallel alternating opaque and transparent lines, the widths of the opaque lines being at least 0.12 inch. After exposure, the plate is developed leaving a series of parallel lines of resist corresponding to the transparent lines of the negative with spaces of bare metal at least 0.12 inch wide between each line of resist.

An etching bath is made having the following formulation:

| | Parts by weight |
|---|---|
| Aqueous nitric acid solution containing 7.6% of $HNO_3$ | 91.26 |
| Mahogany soap solution comprising 62% by weight of petroleum sodium sulfonate having the emperical formula: $C_{24}H_{38}SO_3Na$, the balance being substantially all mineral oil | 0.74 |
| Kerosene (boiling range 125°–294° C.) | 8.0 |

The plate is held at 45° to the horizontal with its mid-point 6.5 inches above the bath having the above formulation. The bath is splashed upwardly against the plate, the resist bearing surface of which faces downwardly. Splashing is continued for 4 minutes at room temperature then the plate is rinsed and dried. The bare portions are etched to a depth of 0.013 inch with an etch factor of 70.

The same solution of nitric acid solution alone under the same condition of use etches a similar plate to a depth of 0.013 inch with an etch factor of 2.2. Substantially the same etch factor is obtained also when the same nitric acid solution is used with either the above amount of mahogany soap solution but no kerosene or with the kerosene but no mahogany soap solution.

*Example 2*

An etching bath is made having the following formulation:

| | Parts by weight |
|---|---|
| An aqueous solution of nitric acid containing 7.65% of $HNO_3$ | 90.5 |
| Mahogany soap solution (same soap solution as in Example 1) | 1.5 |
| Kerosene (same as in Example 1) | 8.0 |

A plate similar to that of Example 1 is etched for 4 minutes at room temperature then rinsed and dried. The plate is etched to a depth of 0.011 inch with an etch factor of 28.

The same nitric acid solution alone or with either one of the added agents without the other produces an etch depth of about 0.013 inch in 4 minutes with an etch factor of about 2.2.

*Example 3*

An etching bath formulation is made having the following formulation:

| | Parts by weight |
|---|---|
| An aqueous nitric acid solution containing 6.9% of $HNO_3$ | 98.25 |
| Mahogany soap solution (same as in Example 1) | 0.97 |
| Kerosene (same as in Example 1) | 0.78 |

A plate similar to that of Example 1 is etched in similar manner with the foregoing etching bath for 4 minutes at room temperature, then rinsed and dried. The depth of etch produced is 0.013 inch, with an etch factor of 7.5.

*Example 4*

An etching bath is made having the following formulation:

| | Parts by weight |
|---|---|
| Aqueous nitric acid solution containing 7.65% of $HNO_3$ | 89.8 |
| Mahogany soap solution (same soap solution as in Example 1) | 1.5 |
| Mineral oil (boiling range 295°–390° C.) | 8.7 |

A plate similar to that of Example 1 is etched for 4 minutes at room temperature, then rinsed and dried. The plate is etched to a depth of 0.015 inch with an etch factor of 8.5.

Using the same nitric acid solution with the mineral oil but without the mahogany soap solution in similar manner on a similar plate, the plate is etched to a depth of 0.015 inch with an etch factor of 2.2.

We claim:

1. An etching bath comprising a mixture of a petroleum sulfonate having from 18 to 30 carbon atoms, a liquid petroleum fraction boiling in the range of 90° to 390° C., and an aqueous solution containing from 3 to 25 per cent of $HNO_3$ by weight, the amount of the petroleum sulfonate being from 0.01 to 0.2 of that of the $HNO_3$ in the aqueous solution, and the weight of the liquid petroleum fraction being at least 1.3 times the weight of the petroleum sulfonate but not more than 0.15 of the weight of the aqueous nitric acid solution.

2. An etching bath according to claim 1 in which the liquid petroleum sulfonate has the emperical formula $C_xH_ySO_3Na$, where $x$ is one of the integers 24, 25, and 26, and $y$ is $(2x-10)$.

3. An etching bath according to claim 1 in which the liquid petroleum fraction boils in the range of 125° to 295° C.

4. An etching bath according to claim 1 in which the liquid petroleum fraction boils in the range of 295° to 390° C.

5. In a method of etching an object of a magnesium-base alloy having portions of its surface masked with an acid resistant coating, the steps which consist in impinging upon the surface of the object so as to contact both the masked and unmasked portions thereof, a mixture of a petroleum sulfonate having from 18 to 30 carbon atoms, a liquid petroleum fraction boiling in the range of 90° to 390° C., and an aqueous solution containing from 3 to 25 per cent of $HNO_3$ by weight, the amount of the petroleum sulfonate being from 0.01 to 0.2 of the weight of the $HNO_3$ in the aqueous nitric acid solution and the weight of the liquid petroleum fraction being at least 1.3 times the weight of the petroleum sulfonate but not more than 0.15 of the weight of the aqueous nitric acid solution.

JOHN A. EASLEY.
HARRY E. SWAYZE.

References Cited in the file of this patent

UNITED STATES PATENTS

| Number | Name | Date |
|---|---|---|
| 1,994,500 | Boller | Mar. 19, 1935 |
| 2,408,155 | Thornbury | Sept. 24, 1946 |
| 2,413,365 | McCoy | Dec. 31, 1946 |